(12) United States Patent
Braun et al.

(10) Patent No.: US 12,536,851 B2
(45) Date of Patent: Jan. 27, 2026

(54) DIAGNOSTIC TROUBLE CODE ALERT MANAGEMENT SYSTEM

(71) Applicant: Deere & Company, Moline, IL (US)

(72) Inventors: Jesse A. Braun, Waukee, IA (US); Graham S. Anderson, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 220 days.

(21) Appl. No.: 18/351,608

(22) Filed: Jul. 13, 2023

(65) Prior Publication Data

US 2025/0022327 A1 Jan. 16, 2025

(51) Int. Cl.
*G07C 5/08* (2006.01)

(52) U.S. Cl.
CPC ......... *G07C 5/0816* (2013.01); *G07C 5/0808* (2013.01); *G07C 2205/02* (2013.01)

(58) Field of Classification Search
CPC .............................. G07C 5/0808; G07C 5/008
USPC ......................................................... 701/29.1
See application file for complete search history.

(56) References Cited

U.S. PATENT DOCUMENTS

| | | | |
|---|---|---|---|
| 9,141,266 B2 | 9/2015 | McCormick et al. | |
| 10,037,630 B2 | 7/2018 | So et al. | |
| 12,029,331 B2 * | 7/2024 | Kaemingk | G06F 16/9035 |
| 2016/0239354 A1 * | 8/2016 | Shen | H04M 1/72451 |
| 2016/0379465 A1 * | 12/2016 | McElhinney | G06Q 10/067 |
| | | | 340/502 |
| 2020/0320845 A1 * | 10/2020 | Livny | H04W 12/60 |

\* cited by examiner

*Primary Examiner* — Navid Z. Mehdizadeh
*Assistant Examiner* — Vincent Feng
(74) *Attorney, Agent, or Firm* — Tucker Ellis LLP; Evan T. Perry

(57) ABSTRACT

An alert management system and technique is provided. Substantially any diagnostic trouble code generates an alert regardless of severity. The operator is given an option to dismiss or suppress re-alert for a class of diagnostic trouble codes, such as low severity codes. Future notification of such codes can be disabled in response to a selection of the option provided.

18 Claims, 6 Drawing Sheets

DIAGNOSTIC TROUBLE CODE ALERT MANAGEMENT SYSTEM

BACKGROUND

Operators want to know when a component or function of a machine or vehicle is faulty. Diagnostic trouble codes are a useful tool to inform operators of issues with the machine or vehicle. Machines and vehicles continue to increase in complexity, leading to more and more components capable of generating diagnostic trouble codes. A risk of over alerting operators also increases. Over alerting can lead to alert fatigue, where an abundance of relatively minor issues increase the potential that more severe alert is overlooked or ignored.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a system is provided. The system includes any of one or more processors being configured to receive a diagnostic trouble code from a component of a machine, determine a severity associated with the diagnostic trouble code, and display a notification of the diagnostic trouble code with an option to disable future notification of the diagnostic trouble code. The option is selectively displayed based on the severity determined.

In another implementation, a method for a receiver of a diagnostic trouble codes is provided. The method includes acquiring a diagnostic trouble code transmitted by a component of a machine. The method also includes displaying a notification of the diagnostic trouble code from the component. The method further includes determining whether to provide an option to disable future notification of the diagnostic trouble code. In addition, the method includes selectively displaying the option to disable future notification of the diagnostic trouble code based on the determination.

In yet another implementation, a system is provided. The system includes a machine having at least one component, where the at least one component includes a controller configured to detect a fault in the at least one component, set a diagnostic trouble code corresponding to the fault detected, and transmit the diagnostic trouble code. The system also includes a receiver configured to: receive the diagnostic trouble code from the at least one component; determine a severity associated with the diagnostic trouble code; and display a notification of the diagnostic trouble code with an option to disable future notification of the diagnostic trouble code, wherein the option is selectively displayed based on the severity determined. When the option is displayed, the receiver is further configured to receive a user input indicative of a selection to disable future notification, and hide the notification of the diagnostic trouble code from further display.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

Various non-limiting embodiments are further described in the detailed description given below with reference the accompanying drawings, which are incorporated in and constitute a part of the specification.

DETAILED DESCRIPTION

Figure 1:
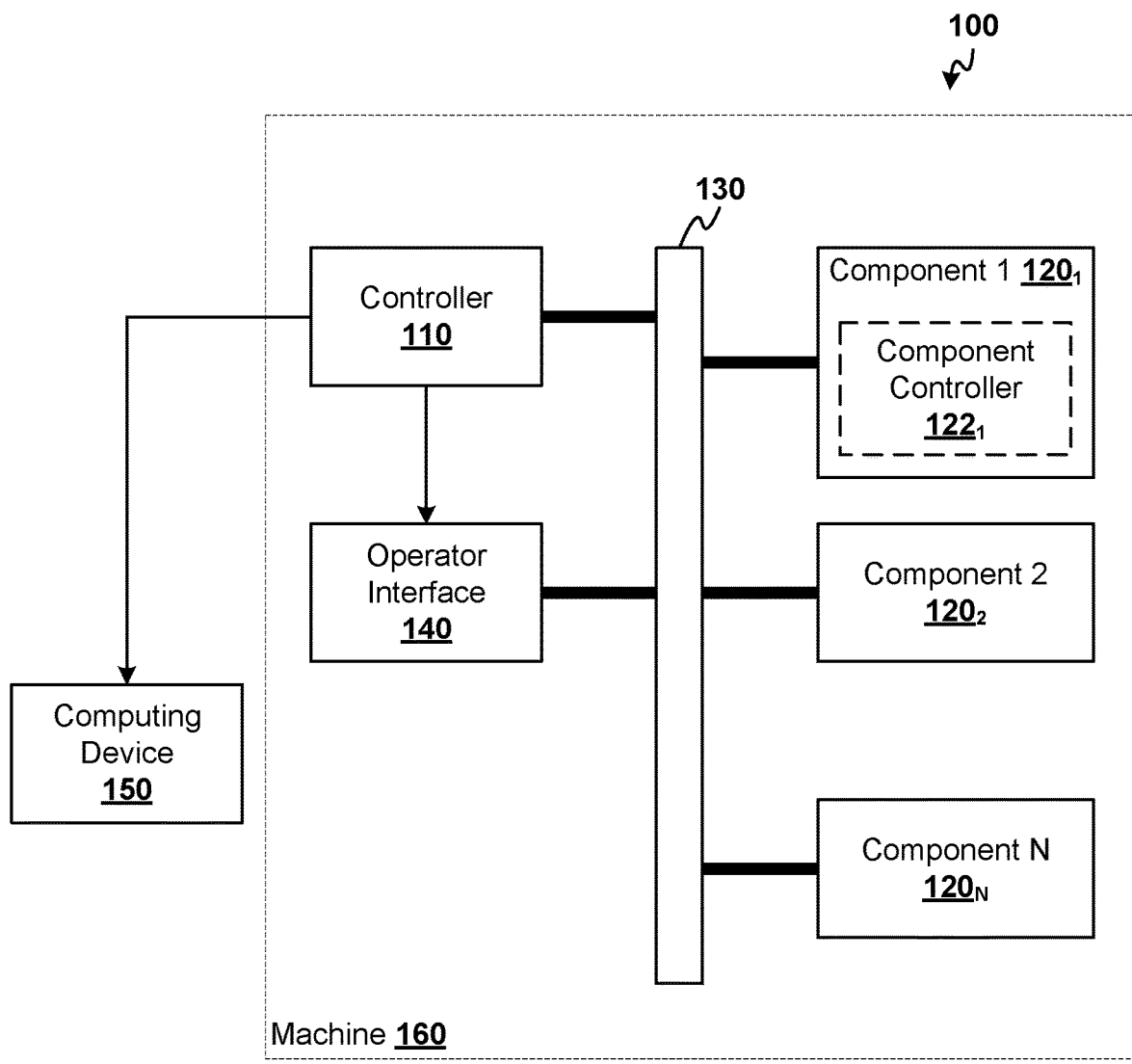
FIG. 1 illustrates an exemplary, non-limiting implementation of a system for management of diagnostic trouble code alerts according to various aspects.

As described above, management of alerts or notifications of diagnostic trouble codes in a machine or vehicle balances a desire to inform an operator of the status of the machine or vehicle with an awareness of avoiding over alerting. Alerts of diagnostic trouble codes are useful to the operator when timely, but the operator can experience alert fatigue when presented with a multitude of alerts. This is particularly prevalent when some alerts relate to minor issues, or issues that need not be addressed. With alert fatigue, other alerts, such as alerts of critical or major issues, can be overlooked or ignored.

As an example of the scope of the risk, state of the art machines or vehicles may have tens or hundreds of individual controllers and/or devices capable of transmitting diagnostic trouble codes. The number of diagnostic trouble codes that may be transmitted by the various devices can be in the thousands.

With alert fatigue in mind, some solutions seek to reduce the amount of alerts. For instance, in some existing implementations, not every diagnostic trouble code results in an operator alert or notification. This technique reduces the chances that major or critical issues go unnoticed. Minor issues, however, may remain unknown. Accordingly, the operator may not possess an accurate understanding of the status of the machine.

An alert management system and technique are described herein that mitigates alert fatigue, but also prevents issues from going unnoticed. Accordingly, the system and technique described herein enables an operator to understand a complete picture of the status of a machine or vehicle. In an aspect, more alerts are initially displayed compared to conventional techniques. In addition, an operator is provided control to reduce, pare back, and/or control alerts. For instance, with traditional techniques, alerts for some diagnostic trouble codes may be hidden or not triggered based on some heuristic (e.g., severity, thresholds, etc.). With the technique described herein, those diagnostic trouble codes do generate alerts, but the operator is given an option to dismiss or suppress re-alert. Thus, an operator is alerted for a certain class of diagnostic trouble codes, which, under a conventional approach, would not generate alerts at all. Future notification of such codes, however, can be selectively hidden with the technique described herein. Accordingly, an enhanced user experience is provided. Specifically, the operator receives better and more information, but also does not get overwhelmed.

In some implementations, notification preferences for diagnostic trouble codes may be associated with device or user profiles. For example, notification preferences may be per operator, per location, and/or per device (e.g., device consuming diagnostic trouble codes). Accordingly, when a selection is made to disable future notifications of a particular diagnostic trouble code, the scope of that disabling may be for a particular operator (e.g., the operator making the selection), for a particular location (e.g., on-board, off-board, etc.), or a particular device (e.g., in-cab display, mobile device, remote or fleet management system, etc.). Thus, different views of diagnostic trouble codes are available to different operators, locations, or devices. Alternatively, however, it is to be appreciated that a dismissal applies to all users, locations, and/or devices, as opposed to just the user, location, or device that or where the dismissal is entered.

In other implementations, dismissal of a diagnostic trouble code may have a timer. For instance, a time frame may also be selected and, after the selected time frame, the diagnostic trouble code may generate an alert again. The time period may be a predetermined time period established by the system. Further, in the alternative, a dismissal may be indefinite.

In a further example, the selection to dismiss alerts for a diagnostic trouble code may be reset when the diagnostic trouble code is cleared. Thus, a future instance of the diagnostic trouble code may generate an alert.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Referring initially to FIG. 1, an alert management system 100 for generating, processing, and controlling alerts associated with diagnostic trouble codes is illustrated. As shown in FIG. 1, system 100 may be partially incorporated in a machine or vehicle 160. By way of example, machine 160 may be an agricultural machine or vehicle, a construction machine or vehicle, a forestry machine or vehicle, or other machines such as engines, etc. The alert management system 100 described herein is applicable to substantially any machine that employs diagnostic trouble codes. The machine 160 may include a plurality of components 120. For instance, the plurality of components 120 may include component $120_1$, component 2 $120_2$, and/or component N $120_N$, where N is any integer greater than or equal to 1. In FIG. 1, component 1 $120_1$ is shown having a component controller $122_1$. It is to be appreciated that other components of the plurality of components 120 may also have component controllers 122 even though not shown in FIG. 1. The plurality of components 120 and component controller 122 are collectively referred to herein as components 120 and component controllers 122 or individual referred to as component 120 and component controller 122 in a general manner.

The component controller 122 may detect a fault in component 120. In response to the detected fault, component controller 122 may set an appropriate diagnostic trouble code or codes. The diagnostic trouble code may be transmitted via a communication medium 130 to various consumers such as a controller 110, an operator interface 140, and/or computing device 150 that may be remote or separate from the machine 160. The communication medium 130 may be a controller area network (CAN) bus over which the controller 110, the component 120, and/or the operator interface 140 communicate. In another implementations, communication medium 130 may utilize other communication protocols beside a CAN bus. Further, communication medium 130 may utilize wireless communication protocols such as cellular communication technologies (e.g., machine-type communications, Internet of Things (IoT) protocols, etc.), short range communications (e.g., Bluetooth, NFC, etc.), or the like. Although shown as communicatively coupled via controller 110, it is to be appreciated that component 120 may directly communicate with computing device 150. Computing device 150 may include a remote management system (e.g., fleet management system, remote diagnostic system, or other cloud-based system), a mobile device, or other computing device (e.g. a laptop). Regardless of the mode of communication, the diagnostic trouble code from component 120 is received by a consumer of diagnostic trouble codes.

The consumer of diagnostic trouble codes may include controller 110, operator interface 140 (e.g., an in-cab display or other machine interface), and/or computing device 150. The operator interface 140 and/or computing device 150 may operate with assistance from controller 110 (e.g., a primary controller of machine 160), or may operate independently. In an aspect, controller 110 may be a computing device having a processor capable of executing computer-executable instructions stored on one or more computer-readable media include non-transitory, computer-readable storage media. By way of illustration, controller 110 may be implemented as a system-on-a-chip (SOC) or other integrated computing system. Controller 110 includes various inputs to receive signals or data from components of system 100. Controller 110 may also output various signals (e.g. control signals) to components of system 100 and/or display output or information on operator interface 140.

For the purpose of this discussion, controller 110, operator interface 140, and/or computing device 150 are collectively referred to as a receiver or consumer. According to various aspects, the receiver of a diagnostic trouble code may selectively output an alert or notification of the diagnostic trouble code to a user or operator. For example, with a first instance of a diagnostic trouble code (following a clear), a notification of the code is displayed. For a class of codes, however, the notification may be displayed with an option to dismiss and/or disable future notification of the code. The receiver may determine a severity of the diagnostic trouble code. If the severity of the code is below a threshold severity level, the notification is displayed with the option to dismiss. Examples of such codes may include codes related to wipers, climate systems, lights, or the like. In general, some codes may have severity levels that are lower since the component and/or the associated fault in the component is not related to a primary purpose or operation of machine 160. When the determined severity of the code is not below the threshold level, the notification of the code does not include the option to dismiss. In a further aspect, codes indicative of major issues (e.g., having a severity above the threshold, etc.) may be temporarily dismissible to enable operation of the display and/or controls of the operator interface. Such severe codes, according to an aspect, may not be provide an option for a user selectable dismissal period as described herein. Accordingly, re-alert may occur, prompting the operator to input a subsequent temporary dismissal or acknowledgement to continue to use the operator interface.

When a notification of a diagnostic code is displayed with an option to dismiss, a user may provide user input indicative of a selection of that option. When selected, future notification of the diagnostic trouble code does not occur. In an aspect, the disabling of further notifications may be device specific. For example, a selection to dismiss a notification on the operator interface 140 may still result in notification on computing device 150. Further, an interface may be provided by computing device 150, whereby a selection to dismiss may be input via the interface of the computing device 150. In another aspect, the dismissal may be user specific. For instance, operator of the machine 160 may be identified with a user code, a code associated with a key, or some other method. The option to dismiss a notification of the diagnostic trouble code may only apply to the identified user. Another user of the machine 160 may still be presented with the notification of the diagnostic trouble code. In this situation, each user may have a corresponding user profile and a dismiss flag indicating whether or not a particular diagnostic trouble code has notification disabled is stored in the user profile. As noted above, such user-specific dismissals may also be input via an interface of the computing device 150.

In yet another aspect, when the option to dismiss the notification is received, further notification of the diagnostic trouble code may be suppressed for a predetermined time period. The time period may be user selected (via user input), or established by system 100 according to severity, or other rationale. In some examples, the time period may be similar for all codes. Following expiration of the time period, notification is reenabled and the operator may be alert again to the diagnostic trouble code.

In yet another aspect, dismissal of notifications of a diagnostic trouble code is reset when the code is cleared or ages. As utilized herein, "ages" or "aged" means that a fault associated with a diagnostic trouble code has not been observed for a period of time. This may be indicative of the fault being remedied, healed, or otherwise resolved. Thus, a subsequent instance of the diagnostic trouble code results in a notification.

Turning to FIGS. 2-7, various features and operations of system 100 are illustrated with exemplary flowcharts. The examples in these figures are illustrative of some features of system 100, but is not exhaustive. Moreover, it is to be appreciated that the methods shown in FIGS. 2-7 are not mutually exclusive. Steps of one method may be performed in parallel with steps of the other methods. In addition, the methods in FIGS. 2-7 may be interleaved such that steps of the various methods may occur in other orders than those shown in the figures and steps in one method may occur sequentially with steps of other methods. One of ordinary skill in the art will appreciate the manner in which the methods of FIGS. 2-7 may combine.

Figure 2:
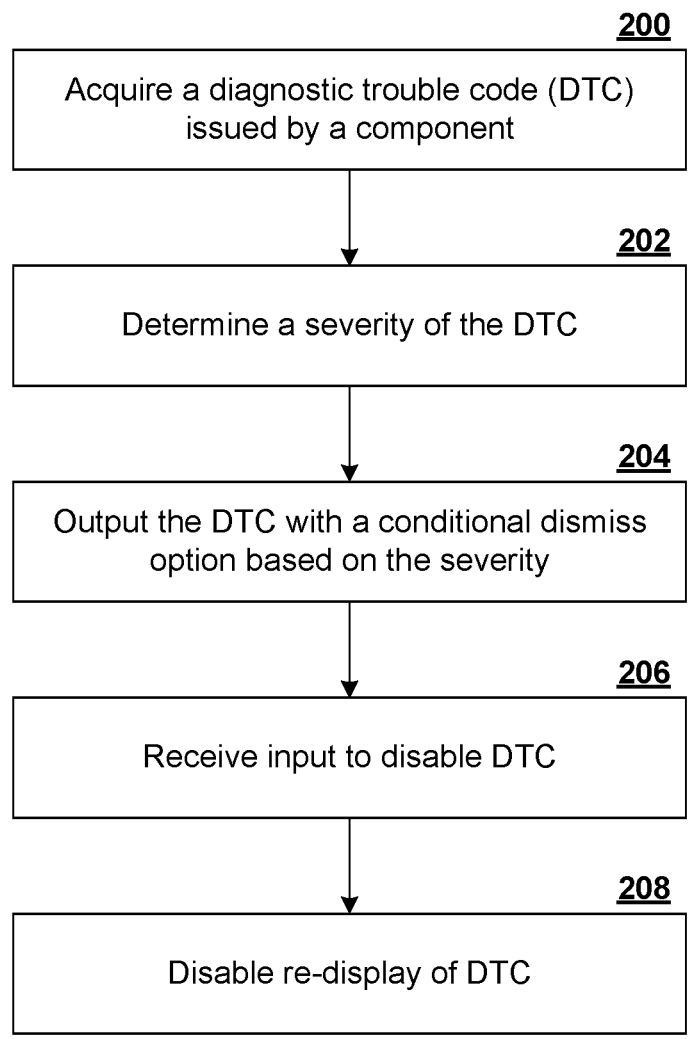
FIG. 2 illustrates a flow chart of an exemplary, non-limiting implementation for managing alerts of diagnostic trouble codes according to various aspects.

Referring now to FIG. 2, a flowchart of a general method is illustrated. The method of FIG. 2, in some implementations, may be performed by controller 110, operator interface 140, and/or computing device 150 shown in FIG. 1. The method can start at reference numeral 200 where a diagnostic trouble code (DTC) is acquired. The DTC is issued by a component of a machine or vehicle, such as an agricultural machine or vehicle, a construction machine or vehicle, etc. At 202, a severity of the DTC is determined. At 204, a notification of the DTC is output with a conditional option to dismiss. The option to dismiss is selectively provided based on the severity determined. When the option to dismiss is available, then an operator may elect to exercise the option. If the operator does so, then, at 206, input to disable the DTC is received. At 208, redisplay of the notification of the DTC is disabled.

Figure 3:
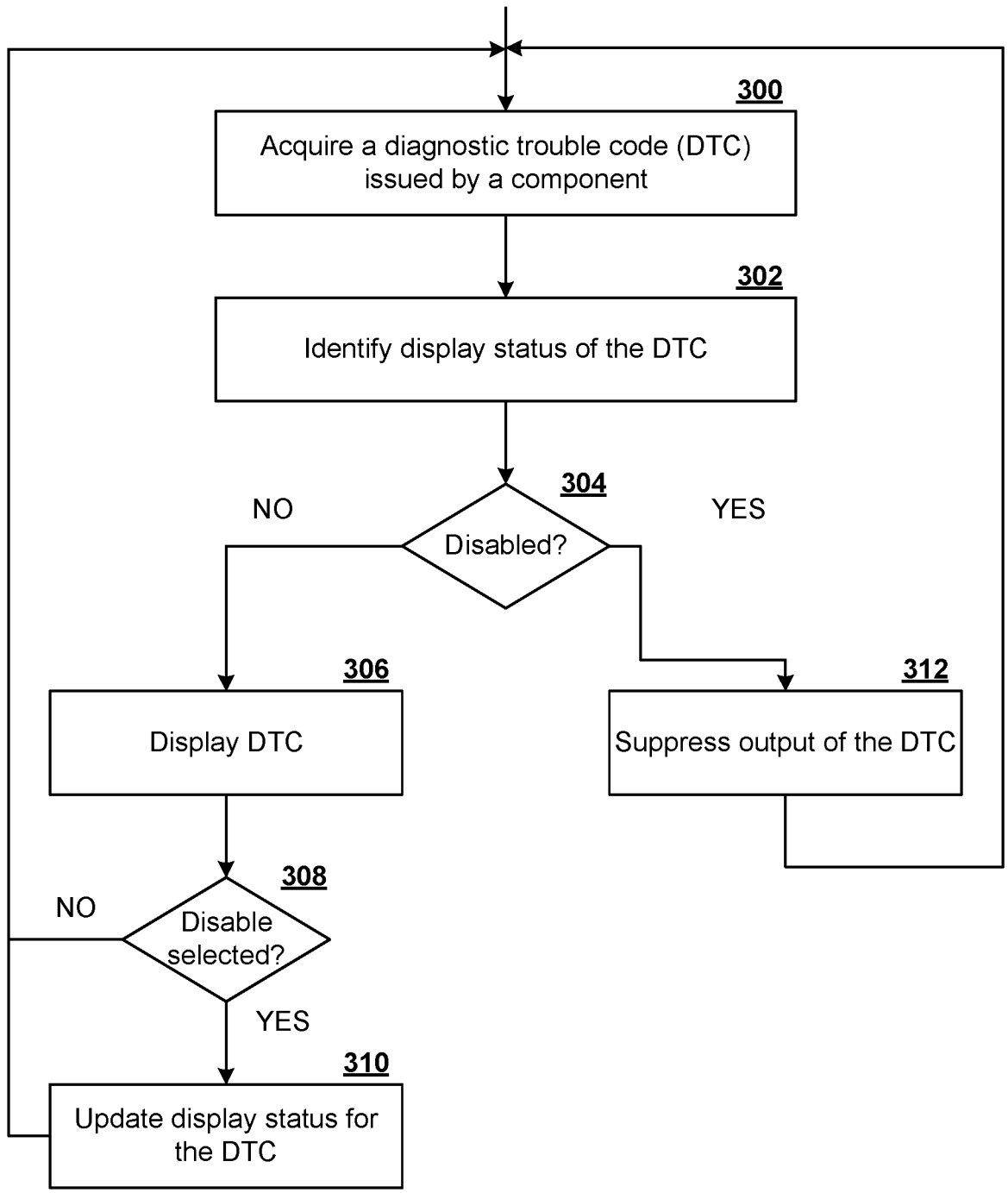
FIG. 3 illustrates a flow chart of an exemplary, non-limiting implementation for managing alerts of diagnostic trouble codes according to another aspect.

Turning to FIG. 3, a method for managing alerts of DTCs is depicted. The method of FIG. 3 may occur at the first instance of a DTC (e.g., when the fault occurs that sets the DTC), or may occur when a machine feature associated with the fault is utilized after the fault has occurred and the DTC remains present. At 300, a DTC issued by a component is acquired. At 302, a display status (e.g. a dismiss flag) associated with the DTC is identified. For example, the method of FIG. 3 may be performed upon a first instance of the DTC, or may be performed after the DTC has been maintained for some time. At 304, a determination is made as to whether the display status indicates that notification is disabled. If yes, then at 312, output of a notification of the DTC is suppressed. If at 304, it is determined that notification is not disabled then, at 306, a notification of the DTC is displayed with an option to disable further notifications. At 308, it is determined whether the option to disable notifications is selected. If yes, the display status associated with the DTC is updated at 310. Further notification of the DTC will be disabled. As will be appreciated later, FIG. 3 relates to DTCs having a relatively low severity and thus are determined to be dismissible.

Figure 4:
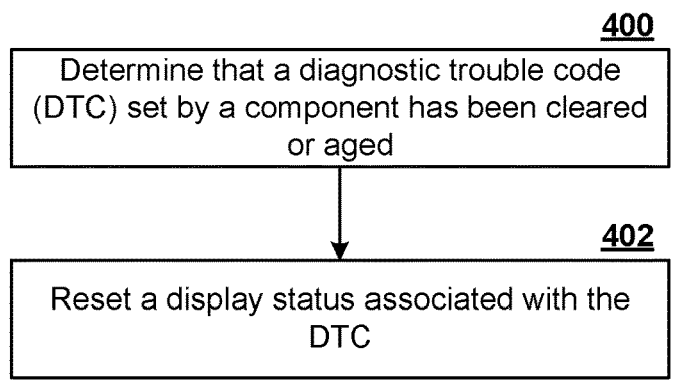
FIG. 4 illustrates a flow chart of an exemplary, non-limiting implementation for managing alerts of diagnostic trouble codes according to another aspect.

FIG. 4 illustrates a flowchart of a method for DTC alert management according to an aspect. In an example, the method of FIG. 4 may be performed in parallel with or subsequent to the method of FIG. 3. The method can start at 400 where it is determined that a DTC set by a component has been cleared or aged. At 402, a display set (e.g. disabled or enabled) associated with the DTC is reset. That is, if the display status indicates that notifications of the DTC are disabled, the status is reset so that future occurrences of the DTC generate an alert.

Figure 5:
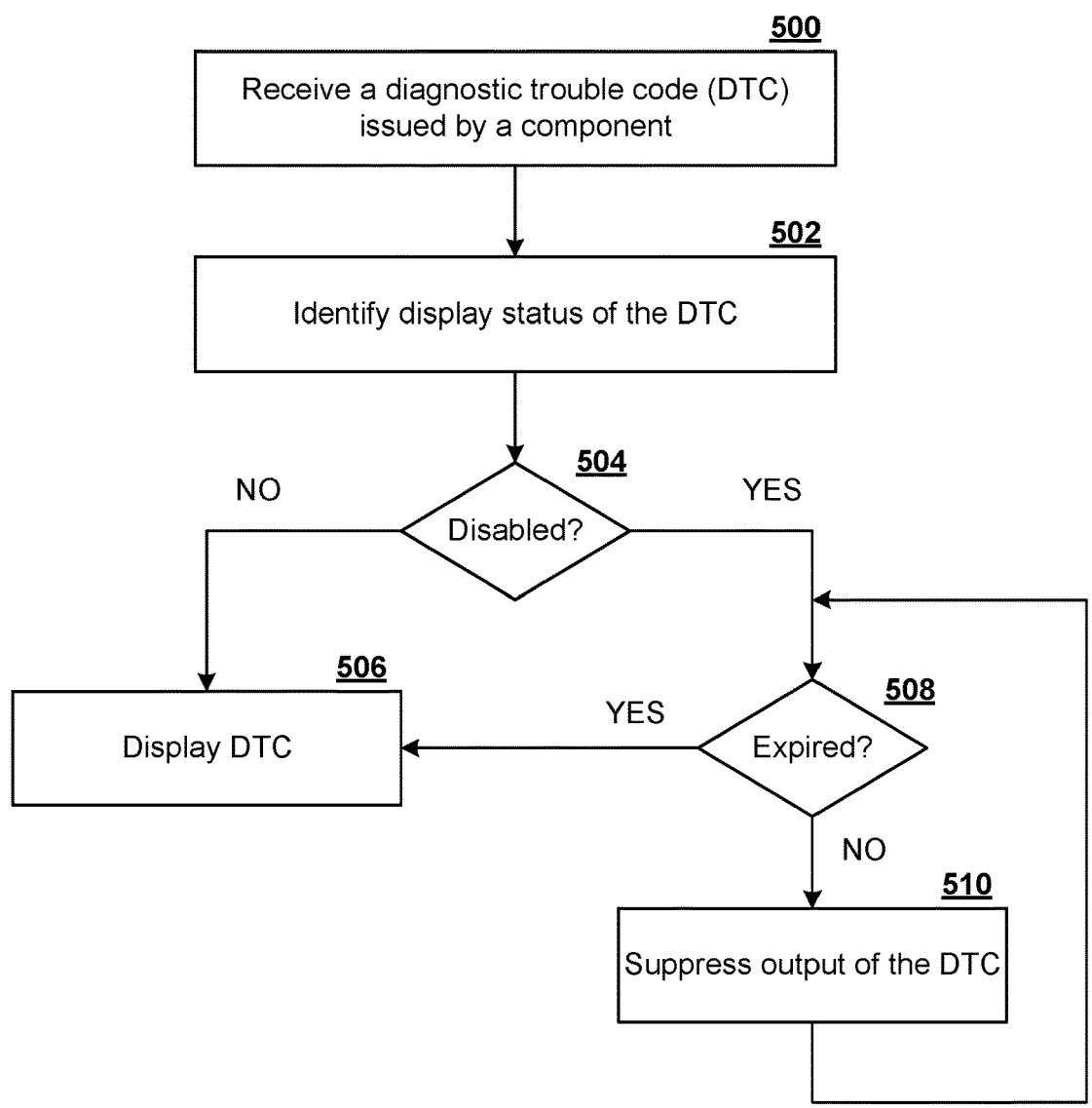
FIG. 5 illustrates a flow chart of an exemplary, non-limiting implementation for managing alerts of diagnostic trouble codes according to another aspect.

Turning to FIG. 5, illustrated is a flowchart of another aspect of the DTC alert management technique described herein. At 500, a DTC issued by a component is received. At 502, a display status (e.g. a dismiss flag) associated with the DTC is identified. At 504, a determination is made as to whether the display status indicates that notification is disabled. If no, then, at 506, a notification of the DTC is displayed. If it is determined that display of alerts for the DTC is disabled, then, at 508, a determination is made as to whether disablement of alerts for the DTC is expired. For instance, a determination is made as to whether a predetermined amount of time has passed since the DTC was set. The predetermined amount of time may be set by a user or established by system. If it is determined that suppression of display of the alert for the DTC has continued beyond the predetermined amount of time, the method transitions to 506 where a notification of the DTC is displayed. If the predetermined amount of time associated with the DTC has not expired, then the method transitions to 510 where an alert of the DTC is suppressed or continues to be suppressed. As shown in FIG. 5, the method may loop back to 508. Thus, the status of the display of the DTC may be checked until a timer expires, or the DTC is cleared/aged (as in FIG. 4). Thus, the method of FIG. 5 prevents a DTC from going stale or ignored for an extended period of time.

Figure 6:
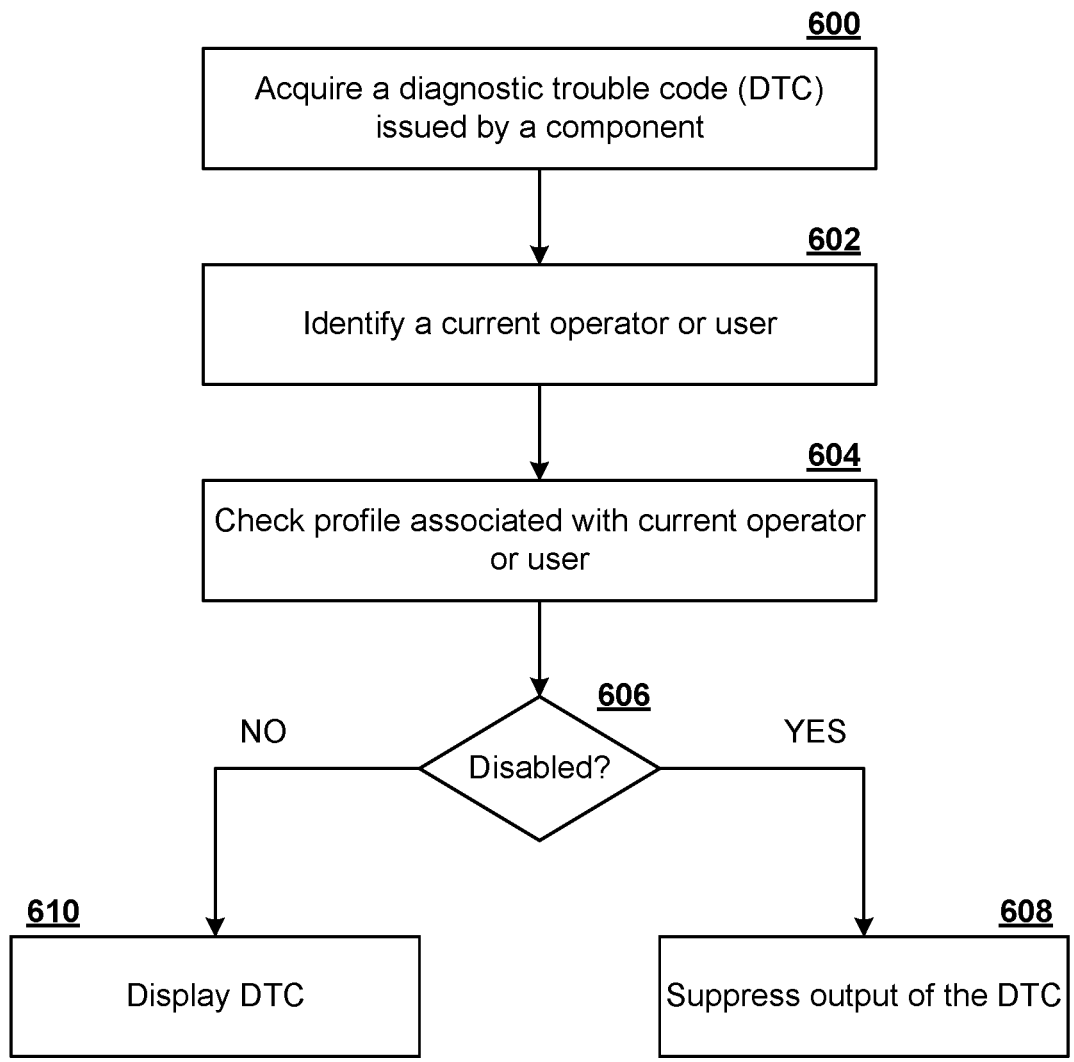
FIG. 6 illustrates a flow chart of an exemplary, non-limiting implementation for managing alerts of diagnostic trouble codes according to another aspect.

Referring now to FIG. 6, another aspect of the DTC management technique is depicted in the illustrated flowchart. At 600, a DTC issued by a component is received. At 602, a current operator or user is identified. At 605, a profile associated with the current operator or user identified is checked for a display status. At 606, a determination is made as to whether, according to the user profile, the display status indicates that notification is disabled. If yes, then at 608, output of a notification of the DTC is suppressed. If at 606, it is determined that notification is not disabled then, at 610, a notification of the DTC is displayed.

Figure 7:
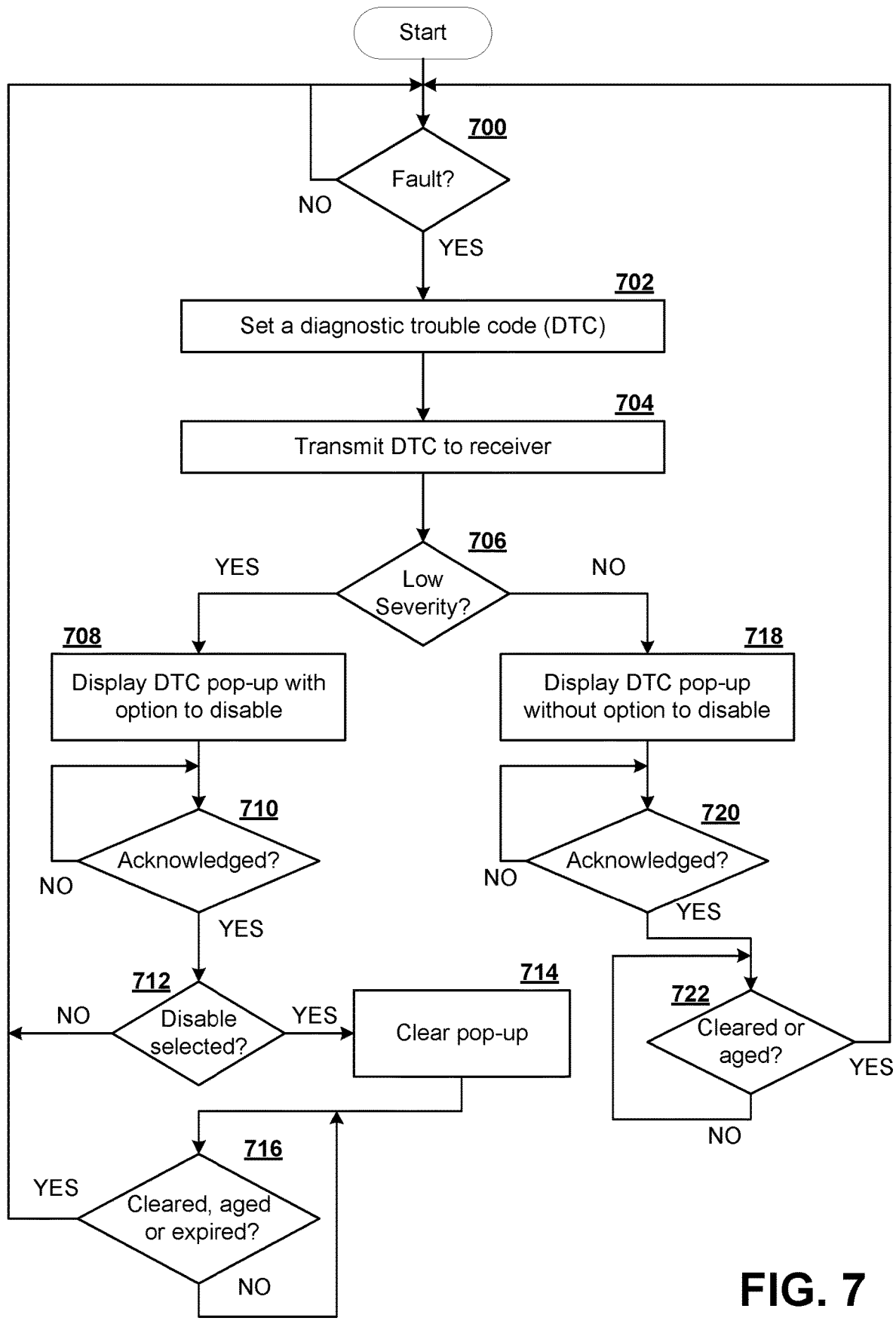
FIG. 7 illustrates a flow chart of an exemplary, non-limiting implementation for managing alerts of diagnostic trouble codes according to another aspect.

FIG. 7 illustrates another flowchart of a DTC alert management method. As shown in FIG. 7, an entry point of the method leads to reference numeral 700 where a determination is made as to whether a fault has occurred. If not, the method returns to the entry point. If yes, a diagnostic trouble code is set at 702 and transmitted to a receiver at 704. In an example, steps 700-704 may be performed by a component of a machine or vehicle.

At the receiver, a determination is made as to a severity of the DTC at 706. If the severity is low, the method moves to 708 where a DTC pop-up (e.g. an alert) is displayed with an option to disable. The method holds at 710 until the DTC pop-up is acknowledged. At 712, a determination is made regarding whether the option to disable notification is selected. If not, the method returns to the entry point. If yes, the pop-up is closed at 714. Subsequently, the method checks at 716 if the DTC is cleared, aged, or a timer associated with disabled notifications has expired. If not, the method loops until that condition is met. If the DTC is cleared, aged, or the timer expired, the method returns to the entry point.

If the severity of the DTC is not low, then the method moves to 718 where the DTC pop-up is displayed, but without an option to disable. The method holds at 720 until the DTC pop-up is acknowledged. At 722, a determination is made as to whether the DTC is cleared, aged, or the associated fault is healed. If yes, the method returns to the entry point. If not, the DTC alert is maintained until the condition is met. In an aspect, for example, a high severity code may result in continued or repeated notifications at some time interval (e.g. every x minutes). A secondary indicator (e.g. a red stop light) may persist for such high severity codes regardless of the behavior of the displayed notification. For lower severity codes, a secondary indicator may also behave in this manner despite the displayed notification being disabled.

According to an aspect, a system is provided. The system includes any of one or more processors. The any of one or more processors being configured to receive a diagnostic trouble code from a component of a machine, determine a severity associated with the diagnostic trouble code, and display a notification of the diagnostic trouble code with an option to disable future notification of the diagnostic trouble code. The option is selectively displayed based on the severity determined.

In an example, any of the one or more processors are further configured to receive a user input indicative of a selection to disable future notification, and hide the notification of the diagnostic trouble code from further display. In one example, any of the one or more processors are further configured to continue hiding notification of the diagnostic trouble code until the diagnostic trouble code is at least one of cleared in the component or aged. In another example, any of the one or more processors are further configured to continue hiding notification of the diagnostic trouble code for a predetermined time period, and after expiration of the predetermined time period, reenable notification of the diagnostic trouble code.

In further examples, any of the one or more processors are further configured to identify a user providing the user input, and associate a setting to hide notification of the diagnostic trouble code with a user profile corresponding to the user identified.

In yet another example, any of the one or more processors are further configured to compare the severity of the diagnostic trouble code with a threshold severity level, and provide the option to disable future notification of the diagnostic trouble code when the severity of the diagnostic trouble code is below the threshold severity level. The option to disable future notification of the diagnostic code is unavailable when the severity of the diagnostic trouble code meets or exceeds the threshold severity level.

In further examples, any of the one or more processors are in the vehicle. Alternatively, any of the one or more processors are incorporated in a computing device separate from the vehicle.

Moreover, the component includes a controller. The controller is configured to detect a fault in the component, set a diagnostic trouble code corresponding to the fault detected, and transmit the diagnostic trouble code to any of the one or more processors.

In another aspect, a method for a receiver of diagnostic trouble codes is provided. The method includes acquiring a diagnostic trouble code transmitted by a component of a machine. The method also includes displaying a notification of the diagnostic trouble code from the component. In addition, the method includes determining whether to provide an option to disable future notification of the diagnostic trouble code. The method further includes selectively displaying the option to disable future notification of the diagnostic trouble code based on the determination.

In some examples of the method, the method further includes receiving a user input indicative of a selection to disable further notification of the diagnostic trouble code in response to the option displayed and hiding display of the notification of the diagnostic trouble code in response to the user input. In addition, the method includes continuing to hide the notification of the diagnostic trouble code until the diagnostic trouble code is at least one of cleared in the component or aged. Further, the method may include reenabling display of the notification of the diagnostic trouble code for a subsequent instance after the diagnostic trouble code is cleared in the component. In another example, the method may include hiding the notification of the diagnostic trouble code for a predetermined time period and reenabling display of the notification of the diagnostic trouble code after expiration of the predetermined time period.

In further examples, determining whether to provide the option may include determining a severity of the diagnostic trouble code, comparing the severity of the diagnostic trouble code with a threshold, and providing the option to disable future notification of the diagnostic trouble code when the severity of the diagnostic trouble code is below the threshold. The method may also include withholding the option to disable future notification of the diagnostic trouble code when the severity of the diagnostic trouble code exceeds the threshold.

In some other examples, the method may include identifying a user providing the user input and disabling notification of the diagnostic trouble code only for the user identified. In other examples, the receiver is remote from the machine.

In yet another aspect, a system is provided. The system includes a machine having at least one component. The at least one component includes a controller. The controller is configured to detect a fault in the at least one component, set a diagnostic trouble code corresponding to the fault detected, and transmit the diagnostic trouble code. The system also includes a receiver. The receiver is configured to receive the diagnostic trouble code from the at least one component, determine a severity associated with the diagnostic trouble code, and display a notification of the diagnostic trouble code with an option to disable future notification of the diagnostic trouble code. The option is selectively displayed based on the severity determined. When the option is displayed, the receiver is further configured to receive a user input indicative of a selection to disable future notification and hide the notification of the diagnostic trouble code from further display.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for DTC alert management have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for DTC alert management. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication.

In summary, various embodiments and examples of systems and methods for multiplex air cart have been disclosed. Although the systems and methods for multiplex air cart have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

The invention claimed is:

1. A system, comprising:
   any of one or more processors being configured to:
   receive a diagnostic trouble code from a component of a machine;
   determine a severity associated with the diagnostic trouble code; and
   display a notification of the diagnostic trouble code with an option to disable future notification of the diagnostic trouble code, wherein the option is selectively displayed based on the severity determined, and wherein the option to disable future notification of the diagnostic code is unavailable when the severity of the diagnostic trouble code meets or exceeds a threshold severity level.

2. The system of claim 1, wherein any of the one or more processors are further configured to:
   receive a user input indicative of a selection to disable future notification; and hide the notification of the diagnostic trouble code from further display.

3. The system of claim 2, wherein any of the one or more processors are further configured to continue hiding notification of the diagnostic trouble code until the diagnostic trouble code is at least one of cleared in the component or aged.

4. The system of claim 2, wherein any of the one or more processors are further configured to:
   continue hiding notification of the diagnostic trouble code for a predetermined time period; and
   after expiration of the predetermined time period, reenable notification of the diagnostic trouble code.

5. The system of claim 2, wherein any of the one or more processors are further configured to:
   identify a user providing the user input; and
   associate a setting to hide notification of the diagnostic trouble code with a user profile corresponding to the user identified.

6. The system of claim 1, wherein any of the one or more processors are further configured to:
   compare the severity of the diagnostic trouble code with the threshold severity level; and
   provide the option to disable future notification of the diagnostic trouble code when the severity of the diagnostic trouble code is below the threshold severity level.

7. The system of claim 1, wherein any of the one or more processors are in the vehicle.

8. The system of claim 1, wherein any of the one or more processors are incorporated in a computing device separate from the vehicle.

9. The system of claim 1, wherein the component includes a controller, the controller being configured to:
   detect a fault in the component;
   set a diagnostic trouble code corresponding to the fault detected; and
   transmit the diagnostic trouble code to any of the one or more processors.

10. A method for a receiver of diagnostic trouble codes, comprising:
    acquiring a diagnostic trouble code transmitted by a component of a machine;

displaying a notification of the diagnostic trouble code from the component;

determining whether to provide an option to disable future notification of the diagnostic trouble code, wherein determining whether to provide the option includes:

determining a severity of the diagnostic trouble code;

comparing the severity of the diagnostic trouble code with a threshold; and selectively displaying the option to disable future notification of the diagnostic trouble code based on the determination, wherein the option to disable future notification of the diagnostic code is unavailable when the severity of the diagnostic trouble code meets or exceeds a threshold severity level.

11. The method of claim 10, further comprising:

receiving a user input indicative of a selection to disable further notification of the diagnostic trouble code in response to the option displayed; and hiding display of the notification of the diagnostic trouble code in response to the user input.

12. The method of claim 11, further comprising continuing to hide the notification of the diagnostic trouble code until the diagnostic trouble code is at least one of cleared in the component or aged.

13. The method of claim 12, further comprising, after the diagnostic trouble code is cleared in the component, reenabling display of the notification of the diagnostic trouble code for a subsequent instance.

14. The method of claim 11, further comprising:

hiding the notification of the diagnostic trouble code for a predetermined time period; and reenabling display of the notification of the diagnostic trouble code after expiration of the predetermined time period.

15. The method of claim 11, further comprising:

identifying a user providing the user input; and disabling notification of the diagnostic trouble code only for the user identified.

16. The method of claim 10, wherein determining whether to provide the option further includes:

providing the option to disable future notification of the diagnostic trouble code when the severity of the diagnostic trouble code is below the threshold.

17. The method of claim 10, wherein the receiver is remote from the machine.

18. A system, comprising:

a machine having at least one component, the at least one component includes a controller configured to:

detect a fault in the at least one component;

set a diagnostic trouble code corresponding to the fault detected; and transmit the diagnostic trouble code; and a receiver configured to:

receive the diagnostic trouble code from the at least one component;

determine a severity associated with the diagnostic trouble code;

display a notification of the diagnostic trouble code with an option to disable future notification of the diagnostic trouble code, wherein the option is selectively displayed based on the severity determined, wherein the option to disable future notification of the diagnostic code is unavailable when the severity of the diagnostic trouble code meets or exceeds a threshold severity level; and when the option is displayed:

receive a user input indicative of a selection to disable future notification; and hide the notification of the diagnostic trouble code from further display.

* * * * *